(12) United States Patent
Adams

(10) Patent No.: US 7,267,114 B1
(45) Date of Patent: Sep. 11, 2007

(54) WILDLAND FIRE VEHICLE ESCAPE SYSTEM

(75) Inventor: Georg B. L. Adams, Duchesne, UT (US)

(73) Assignee: Lemur Group L.L.C., Salt Lake City, UT (US)

( * ) Notice: Subject to any disclaimer, the term of this patent is extended or adjusted under 35 U.S.C. 154(b) by 0 days.

(21) Appl. No.: 11/417,852

(22) Filed: May 3, 2006

(51) Int. Cl.
*F02B 13/06* (2006.01)

(52) U.S. Cl. .................. 123/585; 123/198 D

(58) Field of Classification Search ............... 123/585, 123/196 S, 525, 527, 529, 198 A, 198 D, 123/198 E, 1 A; 137/480; 261/38
See application file for complete search history.

(56) References Cited

U.S. PATENT DOCUMENTS

| | | | | |
|---|---|---|---|---|
| 4,000,615 | A | | 1/1977 | Bockelmann et al. ......... 60/277 |
| 4,271,664 | A | * | 6/1981 | Earnest ..................... 60/39.181 |
| 4,425,937 | A | * | 1/1984 | Stein .......................... 137/480 |
| 4,429,674 | A | * | 2/1984 | Lubbing ..................... 123/531 |
| 4,548,173 | A | * | 10/1985 | Yabumoto et al. .......... 123/308 |
| 4,702,272 | A | * | 10/1987 | MacGuire ................... 137/480 |
| 5,211,150 | A | * | 5/1993 | Anzai ......................... 123/480 |
| 6,105,563 | A | * | 8/2000 | Patrick ........................ 123/585 |
| 6,260,546 | B1 | * | 7/2001 | Vaughn ....................... 123/585 |
| 6,279,550 | B1 | * | 8/2001 | Bryant ..................... 123/559.1 |
| 6,349,709 | B1 | | 2/2002 | Evert et al. ................. 123/585 |
| 6,422,015 | B2 | | 7/2002 | Long ......................... 60/605.2 |
| 6,523,530 | B2 | | 2/2003 | Evert et al. ................. 123/585 |
| 6,758,198 | B1 | | 7/2004 | Suhre et al. ................ 123/585 |
| 6,901,889 | B1 | | 6/2005 | Ritter et al. .................. 123/27 |
| 6,939,517 | B2 | | 9/2005 | Ooe et al. ................... 422/172 |
| 6,945,236 | B2 | | 9/2005 | Nakai et al. ........... 123/568.12 |
| 6,945,237 | B1 | | 9/2005 | Sullivan et al. ........ 123/568.17 |
| 6,945,240 | B2 | | 9/2005 | Kobayashi ............. 123/568.21 |
| 6,948,483 | B2 | | 9/2005 | Veinotte ................. 123/568.18 |
| 7,011,103 | B2 | * | 3/2006 | Delgado ................... 137/15.18 |
| 7,152,408 | B2 | * | 12/2006 | Saliger et al. ............. 60/641.8 |
| 2004/0112344 | A1 | * | 6/2004 | Wark et al. ............ 123/568.15 |
| 2004/0148932 | A1 | * | 8/2004 | Larson ......................... 60/628 |
| 2004/0250804 | A1 | * | 12/2004 | Young ......................... 123/585 |
| 2005/0199231 | A1 | * | 9/2005 | Heider ......................... 123/585 |
| 2006/0037591 | A1 | * | 2/2006 | Ferguson ..................... 123/567 |
| 2006/0260590 | A1 | * | 11/2006 | Lin ............................. 123/585 |
| 2006/0266307 | A1 | * | 11/2006 | Mezheritsky et al. ..... 123/25 C |

* cited by examiner

*Primary Examiner*—Hai Huynh
(74) *Attorney, Agent, or Firm*—J. David Nelson

(57) ABSTRACT

A wildland fire truck engine emergency combustion oxygen supply apparatus for the prevention of stalling of the engine in an oxygen depleted environment. The apparatus has a storage tank mounted on the vehicle for the storage of oxygen, nitrous oxide, or air, a feed line fluidly connecting the storage tank to the engine air intake, a feed valve, and a manual or automated feed valve actuator.

36 Claims, 4 Drawing Sheets

WILDLAND FIRE VEHICLE ESCAPE SYSTEM

FIELD OF THE INVENTION

This invention is in the field of devices for the supply of combustion oxygen to an engine and in particular in the field of devices for the emergency supply of combustion oxygen to the air intake of a vehicle engine when an oxygen depleted environment is encountered.

BACKGROUND OF THE INVENTION

Many wildland firefighters are severely burned or killed as they are engulfed in rapid flame spread. Rapid flame spread results in the localized depletion of oxygen. The terms "deplete", "depleted" and "depletion" shall be defined to include "totally or partially deplete", "totally or partially depleted", and "total or partial depletion" respectively, as these terms apply to oxygen concentration or content. This can cause the engine of a vehicle in which firefighters or other personnel are traveling to splutter and die as it is engulfed in flame. This leaves the firefighters in a stationary vehicle at the mercy of the flames with no means to revive the engine and escape.

A system is needed for wildland fire vehicles and other emergency vehicles engaged in the fighting of wildland fires or the transport or rescue of personnel, which will enable the operator to rapidly engage an inboard source of oxygen for the engine as the vehicle is engulfed in flames, thereby preventing spluttering and stalling or allowing the immediate restarting of the engine. Such a system would enable the engine to run in the midst of the flame front, thereby allowing the operator to back into the "black zone" (burned area) or maneuver the vehicle out of the flame front, saving the occupants from injury or death.

SUMMARY OF THE INVENTION

The present invention in a basic embodiment comprises a pressurized storage tank which is affixed to the vehicle, a feed valve, a manual feed valve actuator affixed in the cab of the vehicle which is readily accessible to the operator, and a feed line to the engine air intake. Preferably the feed line would be connected to the filter air intake chamber of the air filter housing. The feed valve actuator can be a simple mechanical trip release or an electrical pressure switch, which is in communication with the feed valve, and is affixed to the steering column or other operator accessible position.

A more elaborate embodiment incorporates an oxygen sensor, preferably mounted in the filter air intake chamber of the air filter housing, which is in electrical communication with an automated feed valve actuator which actuates the feed valve when the oxygen concentration drops below a pre-selected minimum. This embodiment reduces the probability of splutter and stalling that can occur, thereby delaying evasive action, if flame engulfment occurs unexpectedly or the operator is slow in reacting and activating a manual feed valve actuator.

A negative pressure sensor can also be installed in the intake manifold of the engine which is in communication with the automated feed valve actuator. As the speed of the engine increases, the suction or vacuum in the intake manifold increases, thereby increasing the negative pressure in the intake manifold. The automated feed valve actuator can then use the negative pressure measurement to control the flow of oxygen to the engine to match the demand for combustible oxygen. A negative pressure sensor and an automated feed valve actuator can also be used with a manual feed valve actuator to control the amount of oxygen fed to the engine when the system is activated manually by the operator.

A feed backflow preventor such as a backflow flap, can also be incorporated in the filter air intake chamber of the air filter housing to prevent escape or dilution of the emergency air or oxygen when the emergency oxygen system is activated. The backflow flap will also act as a block to super heated air from the flame engulfment from entering the filter housing and damaging the air filter.

While some preferred embodiments utilize air as the emergency oxygen source, other preferred embodiments utilize oxygen or high oxygen compounds such as nitrous oxide or other oxidation compounds. This can reduce the size of the storage tank and the size of the valve and feed lines. Further, the use of an oxygen system has the potential advantage of reducing or eliminating the need for a feed backflow preventor on the engine air intake. Air intake systems, carburetors and fuel injection systems are adjusted for a normal air mixture containing approximately 21% oxygen. If oxygen is fed, either as concentrated oxygen or as an oxidation compound such as nitrous oxide, at the rate that the oxygen is consumed by the engine, which normally intakes air by imposing a vacuum on the air filter, the balance of the air suctioned through the air filter, will be the oxygen depleted ambient air. For such embodiments, as long as the engine is running, there would always be a flow of ambient air into the air filter intake to mix with the feed oxygen. The rate of oxygen feed could be determined manually or could be determined automatically based upon the speed of the engine, the accelerator engagement, the oxygen concentration of the air in the engine air intake, the oxygen concentration in the ambient air, or other variables. A manual actuator can provide for a constant feed which equals or exceeds the maximum demand of the engine. This would not stop the continuing feed of ambient air but would result in excess oxygen being fed to the engine for most of the rpm range. For a gasoline engine, the optimum fuel air mixture is approximately 14.7%. If excess oxygen is supplied, the excess oxygen would merely be exhausted. In any event, since gasoline and diesel engines are adjusted for a normal air mixture with 21% oxygen, an oxygen content of approximately 21% must be maintained in the feed air in order to prevent the engine from spluttering or stalling.

Pure oxygen embodiments have a disadvantage in comparison to air embodiments in the event of an accident or other event in which the storage tank or feed line is ruptured. The presence of concentrated oxygen increases the risk of vehicular fire or explosion.

An additional component that can be incorporated for other preferred embodiments is a feed flow rate sensor that can installed in the feed line. The air or oxygen flow rate measured by the feed flow rate sensor can be continuously compared with a desired variable flow rate determined based upon the oxygen concentration of the air in the engine air intake, the oxygen concentration in the ambient air, the engine speed, negative pressure in the air intake manifold, or other variables, and the feed rate automatically adjusted accordingly.

The need for a feed backflow preventor can also be eliminated, for embodiments utilizing compressed air, by feeding air at a quantity in excess of the engine demands, causing air to flow out of the filter air intake chamber of the air filter housing despite the demands of the engine. Alternatively, if a feed backflow preventor is incorporated, a feed flow rate sensor can be used to match the flow rate to the engine demands so that the internal pressure of the air filter housing which is contained by the housing and the feed backflow preventor is controlled to a tolerable level.

DETAILED DESCRIPTION

Figure 1:
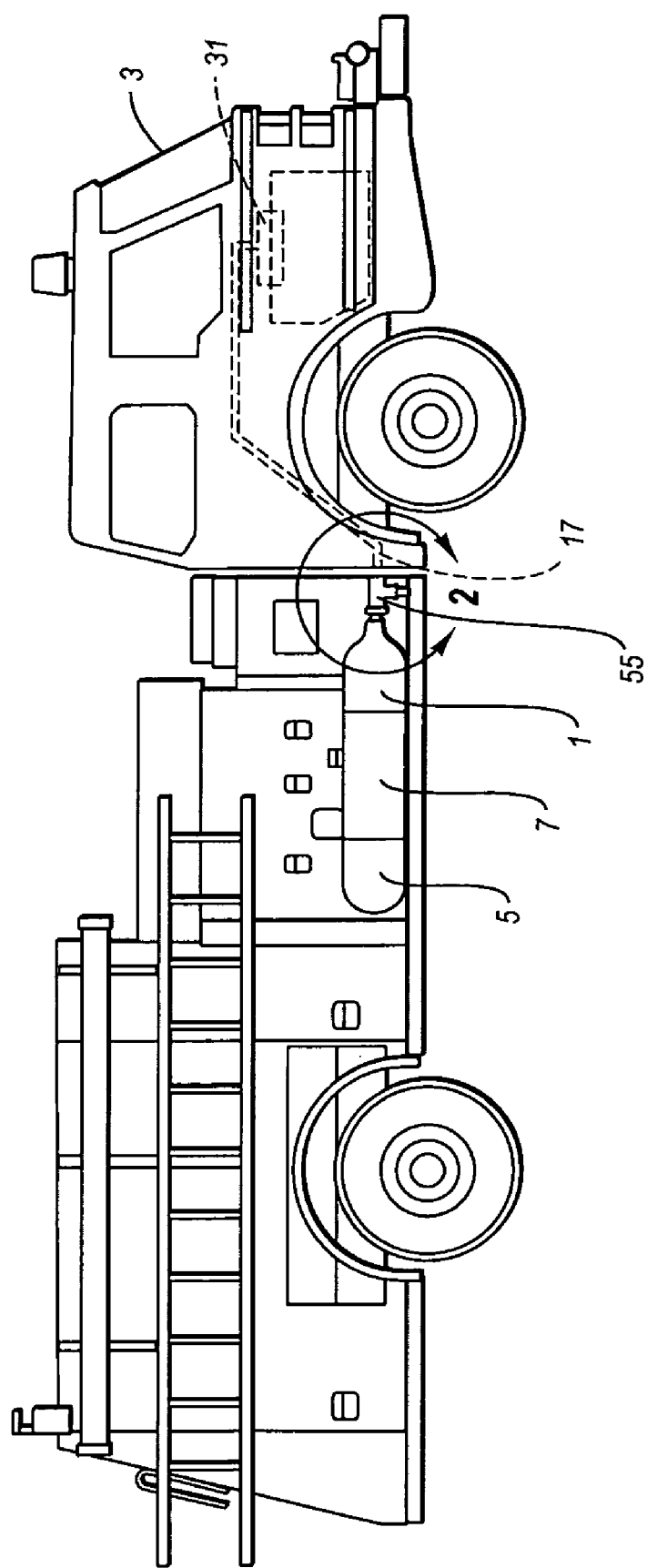
FIG. 1 is a side view cross-section schematic of an embodiment of the emergency oxygen supply apparatus of the present invention as installed on a wildland fire truck.

Referring first to FIG. 1, a schematic of an embodiment of the emergency oxygen supply apparatus 1 of the present invention as installed on a wildland fire truck 3 is shown. Pressurized, oxygen containing gas 5 is stored in a pressurized storage tank 7. If air is to be used, in order to store an adequate supply of air for a reasonable escape period, which the inventor believes should be at least sixty (60) seconds, approximately 6500 to 9000 liters (230 to 320 cubic feet) of air as measured at sea level atmospheric pressure would be required for an exemplar 6000 cubic centimeter ("cc"), 200 horsepower ("hp") wildland fire truck engine. Assuming a maximum tank gauge pressure of 4500 pounds per square inch ("psi") or less, multiple tanks would be required to meet the demand stated above.

By comparison, for pure oxygen, only 1400 to 1900 liters (50 to 70 cubic feet) would be required for the exemplar engine described above. For a vehicle with limited space, a pure oxygen system or a system using a high oxygen compound such as nitrous oxide will be preferable. Whether air, oxygen, or a high oxygen compound is used, because of the size of the storage tank or tanks, permanently mounted storage tanks are preferable. Since air is normally approximately 21% oxygen, five times as much storage is required for air as compared to pure oxygen. Similarly, since nitrous oxide is approximately fifty percent (50%) oxygen, approximately two and one-half (2½) times as much storage is required for air as for nitrous oxide.

Figure 2:
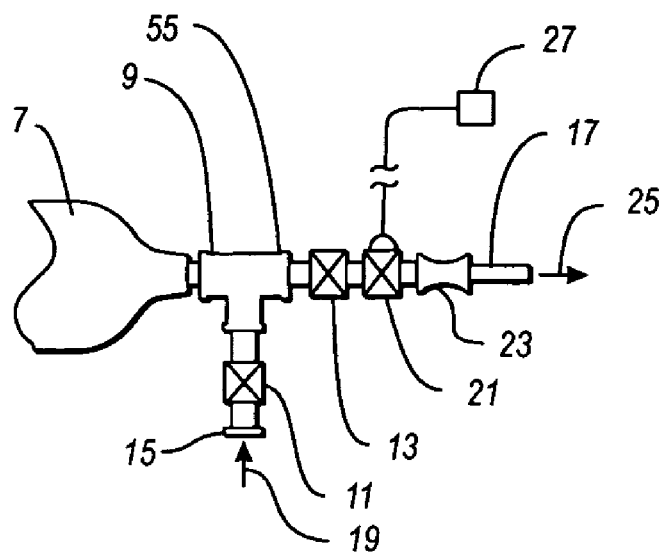
FIG. 2 is a side view perspective detail of a pressurized storage tank of an embodiment of the present invention showing a preferred valve arrangement and feed line connection.

Referring also to FIG. 2, a refill assembly 55, which can include a standard tee 9, a refill shutoff valve 11, a service shutoff valve 13 and a refill coupling 15 permit the shutoff of the feed line 17, the attachment of a refill source 19, opening the refill valve, and recharging the storage tank. With the storage tank full and service shutoff valve open, the feed valve 21 is placed in service, awaiting manual or automatic actuation.

An optional feed flow rate sensor 23, for which the inventor prefers a magnetic flow meter which effectively measures the mass flow and can be used to determine the effective fluid flow rate 25 at the ambient air pressure or at a reference pressure such as sea level atmospheric pressure. The flow rate information can be transmitted to an automated feed valve actuator 27, compared by the actuator to a desired flow rate, which may be a fixed flow rate or a variable flow rate, and used to adjust the feed valve to produce an emergency flow rate which is approximately equal to the desired flow rate, which will be dependent on the type of oxygen containing gas that is used.

Whether air, oxygen or an oxygen compound is used, depending upon the anticipated ambient temperature variation, the air or oxygen should be dry to prevent freezing in the feed valve or the feed line.

Figure 3:
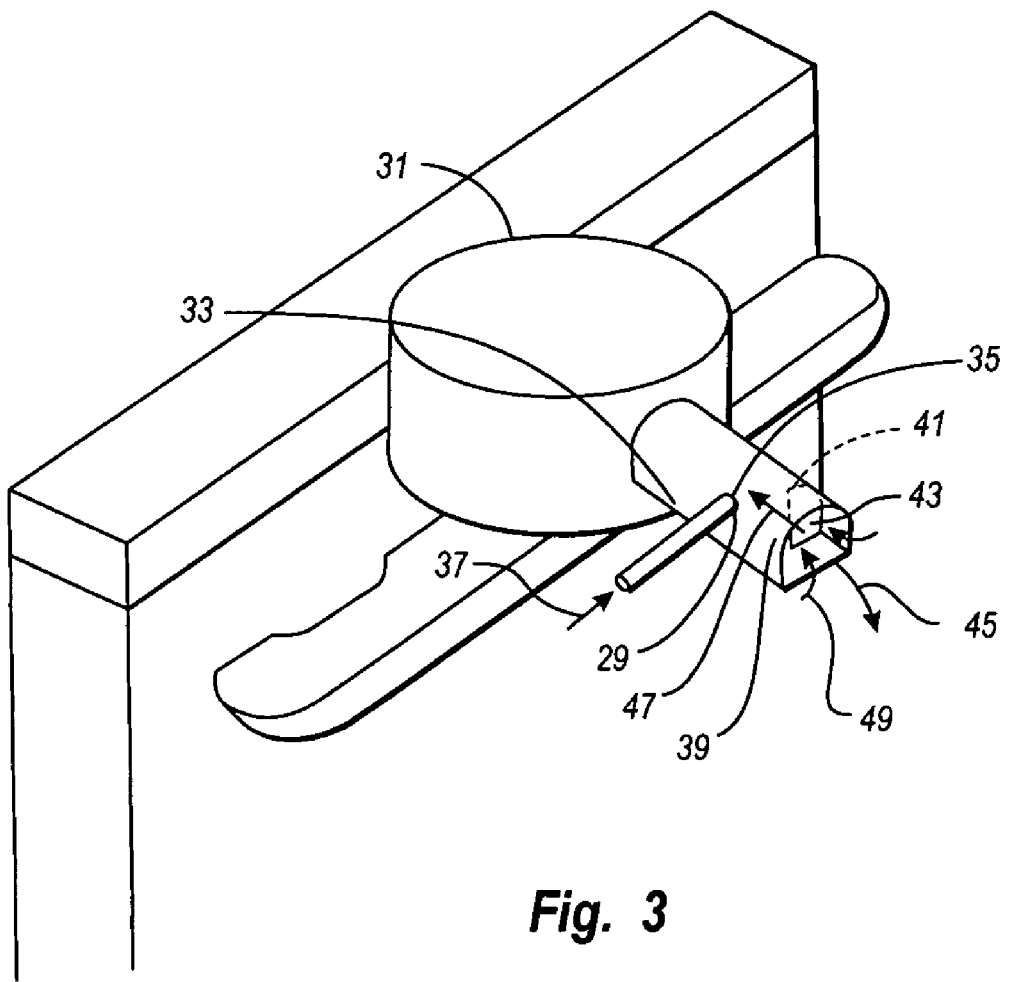
FIG. 3 is a front view perspective detail of an engine air filter housing with feed line attached and fluidly connected to the filter air intake chamber of the air filter housing.

Referring now to FIG. 3, a detail of a preferred feed connection 29 to an air filter housing 31 is shown. A preferred injection position 33 for the feed injector 35 for the feed gas 37 into the intake chamber 39 is shown. The embodiment shown also includes a feed backflow preventor 41, which for this embodiment is a backflow flap 43, which can be used to minimize the feed gas loss 45 and feed gas dilution 47 with oxygen depleted ambient air 49. It should be noted that the feed valve could be located at the air filter housing or at any position between the storage tank and the injection position. The advantage of the position shown in FIG. 2 is that the feed line 17 is not pressurized while the emergency air supply apparatus is in a ready configuration, awaiting activation by the feed valve actuator 27 and the feed valve 21, when an oxygen depleted environment is encountered. Further, rather than experiencing the high constant pressure of the pressurized storage tank, the feed line experiences a reduced pressure downstream of the feed valve.

Figure 6:
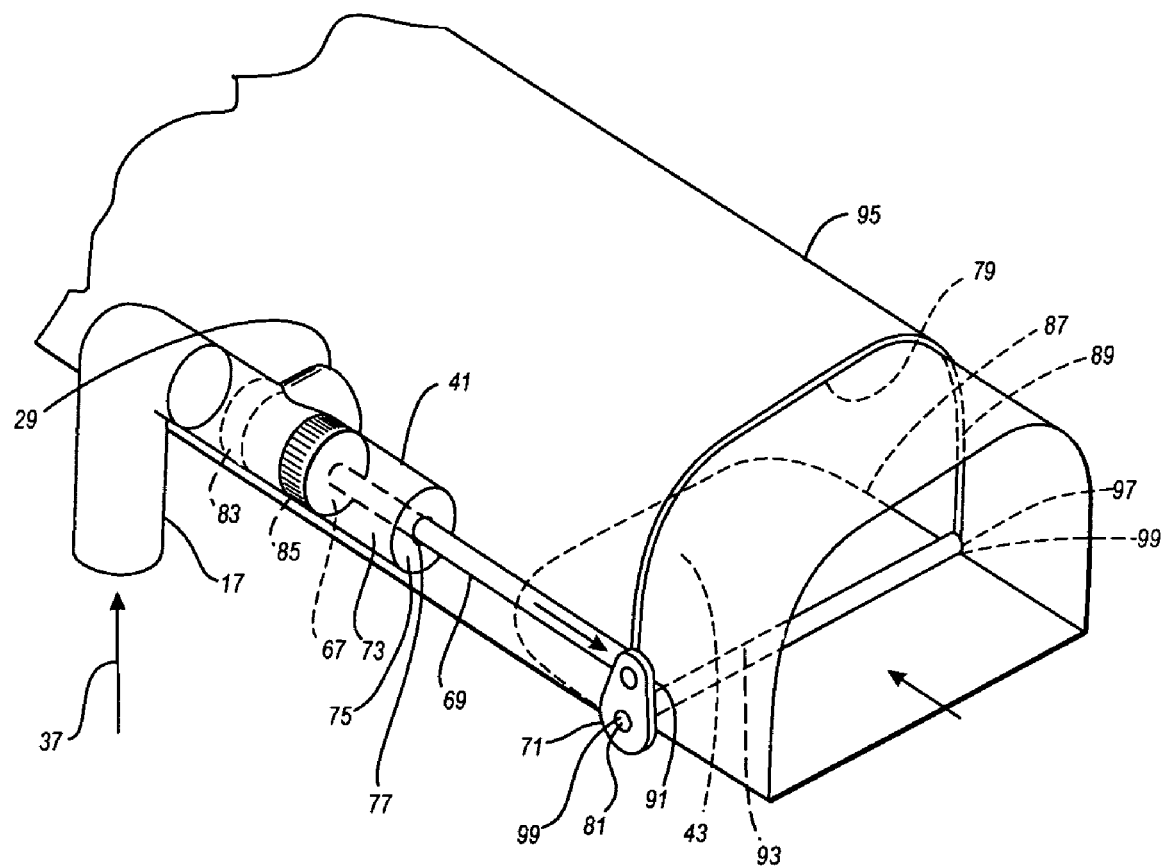
FIG. 6 is a front view perspective detail of a filter air intake chamber of an engine air filter housing with an embodiment of a feed line and feed line actuated backflow flap installed in the filter air intake chamber.

Referring to FIG. 6, a detail of a preferred embodiment of a backflow preventor 41 utilizing a backflow flap 43 is shown. This embodiment utilizes the pressure from the feed gas 37 on a backflow piston 67 to move the backflow piston from a disengaged piston position 83 to an engaged piston position 85, thereby rotating the backflow flap from a flap disengaged position 87 to a flap engaged position 89. The backflow piston rotates a flap cam 71 by means of the backflow rod 69 which is rotatably attached to the flap cam free end 91. The flap cam is rigidly affixed to a flap shaft 81 which passes through the air intake shell 95 and is rigidly affixed to the flap bottom 93. Hence as the flap cam rotates, the backflow flap rotates. A flap stop 79 stops the backflow flap at the flap engaged position 89. When the feed gas is turned off, the suction of the engine will return the backflow flap to the flap disengaged position 87.

Vehicle air intake systems, carburetors and fuel injection systems, are sized and adjusted for a normal air mixture containing approximately twenty one percent (21%) oxygen, which varies somewhat depending upon the elevation. Therefore, an oxygen containing gas with an oxygen content of approximately 21% is most compatible with a vehicle air intake system. However, while air can be used, use of oxygen or a high oxygen compound gas such as nitrous oxide rather than air can reduce the size of the storage tank and the size of the valve and feed lines and can eliminate the need for a feed backflow preventor. If oxygen is fed at a rate which equals or exceeds the rate that the oxygen is consumed by the engine, which normally intakes air by imposing a vacuum on the air filter, the balance of the air suctioned through the air filter, will be the oxygen depleted ambient air. For such embodiments, as long as the engine is running, there is always a flow of ambient air into the air filter intake to mix with the feed oxygen. The rate of air or oxygen feed could be determined by the oxygen concentration of the air in the engine air intake, the oxygen concentration in the ambient air, the speed of the engine, the accelerator engagement, or other variables.

A simplified automated embodiment utilizes the oxygen concentration in the engine air intake as measured by an oxygen sensor affixed in the filter air intake chamber. The oxygen concentration is transmitted to the automated feed valve actuator and the feed valve is controlled by the automated feed valve actuator to transmit via the feed line the amount of additional oxygen required by the engine at a selected maximum engine speed, for the oxygen concentration measured.

If the oxygen sensor is positioned in the air intake chamber between the feed injector and the engine, a continuous oxygen concentration signal transmitted to the automated feed valve actuator can be used by the automated feed valve actuator to continuously adjust the feed rate of the oxygen, oxygen compound or air up or down to maintain, within an acceptable tolerance, the oxygen concentration in the air going to the engine at 21%. This will provide for a more efficient use of the emergency oxygen, oxygen compound or air supply.

An alternative efficient simplified embodiment utilizes both the oxygen concentration in the engine air intake and the engine speed as measured by a tachometer, the oxygen concentration and the engine speed being continuously transmitted to the feed valve actuator. Obviously, the amount of oxygen consumed by the engine is dependent on the speed of the engine, as is the quantity of air suctioned into the engine through the air filter. Thus when the feed valve actuator adjusts the amount of oxygen or air transmitted to the engine air intake, to match both the speed of the engine and the concentration of oxygen in the air in the engine air intake, it provides an adequate amount of oxygen to prevent splutter or stalling while at the same time providing for efficient use of the oxygen. Alternatively, rather than utilizing engine speed, accelerator depression or engagement, which determines the speed or power being demanded of the engine, or intake manifold negative pressure can be used in conjunction with the measured oxygen concentration.

A negative pressure sensor can be installed in the intake manifold of the engine which is in communication with the automated feed valve actuator. As the speed of the engine increases, the suction or vacuum in the intake manifold increases, thereby increasing the negative pressure in the intake manifold. The automated feed valve actuator can then use the negative pressure measurement to control the flow of oxygen to the engine to match the demand for combustible oxygen. A negative pressure sensor and an automated feed valve actuator can also be used with a manual feed valve actuator to control the amount of oxygen fed to the engine when the system is activated manually by the operator.

These automated embodiments may also utilize an oxygen or air flow meter in the feed line to provide an actual flow rate to the automated actuator for use by the actuator in controlling the feed valve.

If a manual feed valve actuator is to be used, the feed rate for air or oxygen may be fixed at a rate which will satisfy the oxygen requirements of the engine at a selected maximum engine speed. However, even with a manual actuator, the rate of oxygen or air supplied can be variable and based upon engine speed or other factors, through the use of an automated feed valve actuator along with the manual feed valve actuator. If a fixed feed rate of oxygen or oxygen compound is used with a manual actuator, there is a continuing feed of ambient air to mix with the oxygen. This would result in excess oxygen being fed to the engine for most of the rpm range. The excess oxygen may merely be exhausted. If a manual actuator is used with air and the feed rate is fixed at a desired maximum rate, for most of rpm range of the engine, excess air would be vented from the air filter.

Pure oxygen systems have a disadvantage of safety concerns in the event of an accident or other event in which the storage tank or feed line is ruptured. The presence of pure oxygen increases the risk of accelerated vehicular fire or explosion. This is potentially a problem with excess oxygen being supplied to the engine. Overheating of the engine could result.

Pure oxygen or oxygen compound embodiments will preferably include an oxygen sensor for monitoring the oxygen concentration in the ambient air at the vehicle. As indicated above, the oxygen sensor is preferably affixed in the filter air intake chamber 39 of the air filter housing 31 along with the feed line 17 and the feed injector 35. The oxygen sensor can also be positioned externally on the vehicle so that an oxygen deficiency in the ambient air can be detected in advance, albeit briefly, of the oxygen deficiency being experienced by the engine. As the oxygen concentration of the ambient air decreases below the normal concentration of approximately twenty one percent (21%), the signal from the oxygen sensor, which is transmitted to an automated feed valve actuator 27, is used by the automated feed valve actuator to actuate and control the feed valve, thereby releasing oxygen to the filter air intake chamber and maintaining the concentration of the air flowing to the engine at an oxygen concentration equaling or exceeding the normal concentration of approximately 21%.

Referring again to FIG. 2, if the feed flow rate sensor 23 is incorporated in the feed line 17, the measured feed flow rate 25 can be compared with a desired variable flow rate based upon the engine rpm, as measured by a tachometer, or some other parameter, or based upon a desired constant flow rate which is adequate for a pre-determined maximum design engine rpm. The need for a feed backflow preventor can also be eliminated, for embodiments utilizing compressed air, by feeding air at a feed rate in excess of the engine demands, causing air to flow out of the filter air intake chamber of the air filter housing despite the demands of the engine. Alternatively, if a feed backflow preventor is incorporated, the feed flow rate sensor can be used in conjunction with an automated actuator to control the feed valve to match the air flow rate to the engine demands so that the internal pressure of the air filter housing which is contained by the housing and the backflow is controlled to a tolerable level.

Figure 4:
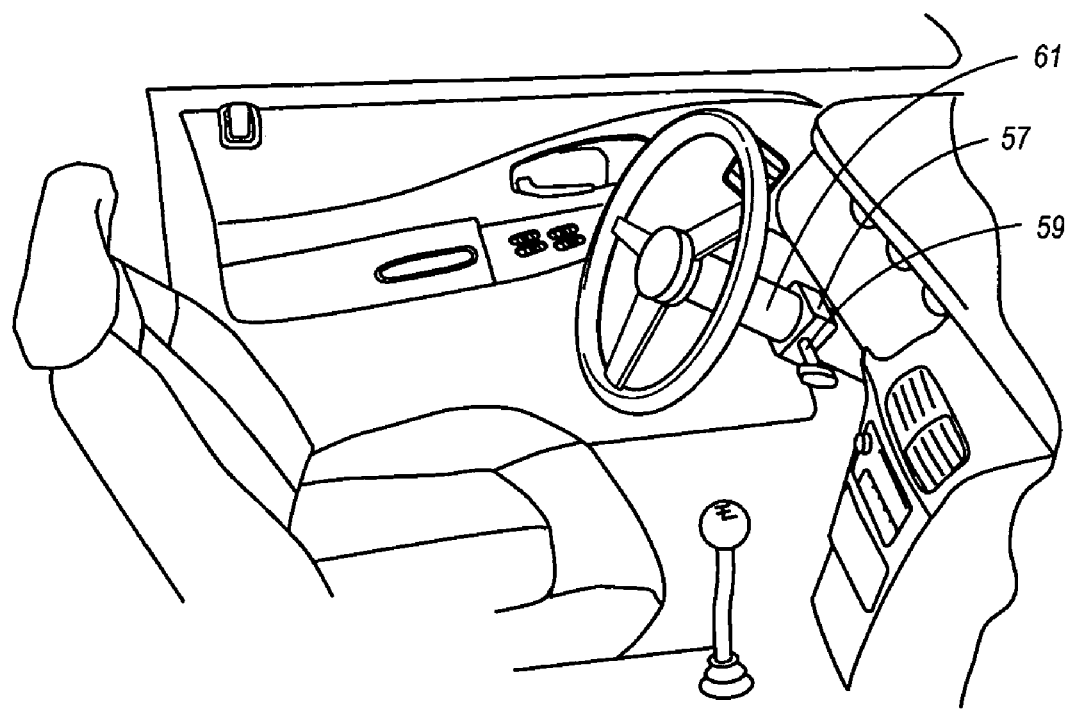
FIG. 4 is a side view perspective detail of a manual actuator of an embodiment of the present invention attached to the steering column of a vehicle.

Referring now to FIG. 4, a preferred embodiment of a manual actuator installation 57 incorporating a manual actuator switch 59 which is affixed to the steering column 61 of a vehicle. For this embodiment, the manual actuator switch is in electrical communication with the actuator valve. However, other embodiments may utilize hydraulic or other actuator communication means known to persons skilled in the art between the actuator switch and the actuator valve Referring to FIG. 5, an electrical schematic of an automated control system 63 of an automated embodiment of the emergency air supply apparatus of the present invention. This embodiment incorporates an oxygen sensor 65 and a feed flow rate sensor 23. The oxygen sensor, which will preferably be mounted in the intake chamber and be in electrical or wireless communication with the feed valve actuator 27, provides an ambient air oxygen concentration signal that is used by the feed valve actuator to determine when to actuate the feed valve. The feed flow rate sensor generates a feed gas flow rate signal which is used by the feed valve actuator to control the feed gas flow rate by adjusting the feed valve.

Figure 5:
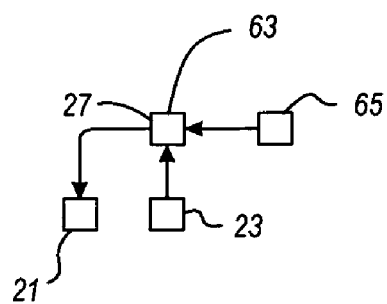
FIG. 5 is a electrical schematic of a preferred automated embodiment of the emergency oxygen supply apparatus of the present invention with an oxygen sensor and a feed flow rate sensor.

Other embodiments may incorporate an automated control system as shown in FIG. 5 and a manual actuator switch as shown in FIG. 4 which can be used by the operator to override the automated control system and can be used by the operator to take preventive action in response to an imminent rapid flame spread.

Several embodiments of an automated control system for the emergency oxygen supply apparatus are described above. As described, the automated control system can consist of an automated feed valve actuator, one or more sensors, a tachometer, or other instrumentation. The automated control system receives signals and controls the feed valve to release an appropriate amount of air, oxygen or oxygen compound, depending upon the conditions. The automated control system can consist of an automated feed valve actuator and one or more sensors, coupled with a manual feed valve actuator, with the manual feed valve actuator being used by the operator to turn the system on and the automated feed valve actuator then controlling the flow of air, oxygen or oxygen compound based upon one or more conditions. Based upon current technology, the automated feed valve actuator would preferably consist of a simple digital computer and receiving and transmitting devices as needed to be compatible with the sensors and other devices transmitting signals to the automated feed valve actuator and to be compatible with the feed valve which is to receive a control signal from the automated feed valve actuator. Other embodiments of the automated control system will be known to persons skilled in the art. Advances in technology will certainly provide improvements and additional embodiments for the automated control system, including the automated feed valve actuator and the sensors.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Vehicle engine emergency combustion air supply apparatus for the prevention of stalling of the engine in an oxygen depleted environment, the engine having an engine air intake, the apparatus comprising:
   a) pressurized air storage tank mounted on the vehicle, the tank having a pressurized air storage capacity adequate for supplying all of the combustion air required by the engine for a selected escape period;
   b) feed line fluidly connecting the storage tank to the engine air intake;
   c) feed valve; and
   d) feed valve actuator in communication with the feed valve.

2. Apparatus as recited in claim 1 wherein the feed valve actuator comprises an automated feed valve actuator.

3. Apparatus as recited in claim 2 further comprising an ambient air oxygen sensor in communication with the automated feed valve actuator.

4. Apparatus as recited in claim 2 further comprising a feed flow rate sensor installed in the feed line, the feed flow rate sensor being in communication with the automated feed valve actuator.

5. Apparatus as recited in claim 2 wherein the vehicle has an engine tachometer and the apparatus further comprises a tachometer link providing communication between the tachometer and the automated feed valve actuator.

6. Apparatus as recited in claim 1 further comprising a feed backflow preventor.

7. Apparatus as recited in claim 1 wherein the engine has an air filter housing with a filter air intake chamber, wherein the engine air intake is the filter air intake chamber, and wherein the feed line is fluidly connected to the filter air intake chamber.

8. Apparatus as recited in claim 7 further comprising a feed backflow flap for the filter air intake chamber.

9. Apparatus as recited in claim 7 further comprising feed line pressure activated feed backflow flap for the filter air intake chamber.

10. Apparatus as recited in claim 1 wherein the vehicle has an operator position and the feed valve actuator is a manual actuator switch affixed to the emergency vehicle in an actuator position readily accessible to an operator in the operator position.

11. Apparatus as recited in claim 1 further comprising a refill assembly.

12. Apparatus as recited in claim 1 further comprising an automated control system.

13. Vehicle engine emergency combustion air supply apparatus for the prevention of stalling of the engine in an oxygen depleted environment, the engine having an engine air intake, the apparatus comprising:
   a) one or more pressured air storage tanks mounted on the vehicle, the tanks having a total pressurized air storage capacity adequate for supplying all of the combustion air required by the engine for a selected escape period;
   b) one or more feed lines fluidly connecting the storage tanks to the engine air intake;
   c) one or more feed valves; and
   d) feed valve actuator in communication with the feed valves.

14. Apparatus as recited in claim 13 wherein the feed valve actuator comprises an automated feed valve actuator.

15. Apparatus as recited in claim 14 further comprising an ambient air oxygen sensor in communication with the automated feed valve actuator.

16. Apparatus as recited in claim 14 further comprising one or more feed flow rate sensors installed in the feed lines, the feed flow rate sensors being in communication with the automated feed valve actuator.

17. Apparatus as recited in claim 13 wherein the vehicle has an engine tachometer and the apparatus further comprises a tachometer link providing communication between the tachometer and the automated feed valve actuator.

18. Apparatus as recited in claim 13 further comprising a feed backflow preventor.

19. Apparatus as recited in claim 13 wherein the engine has an air filter housing with a filter air intake chamber, wherein the engine air intake is the filter air intake chamber, and wherein the feed lines are fluidly connected to the filter air intake chamber.

20. Apparatus as recited in claim 19 further comprising a feed backflow flap for the filter air intake chamber.

21. Apparatus as recited in claim 19 further comprising a feed line pressure activated feed backflow flap for the filter air intake chamber.

22. Apparatus as recited in claim 13 wherein the vehicle has an operator position and the feed valve actuator is a manual actuator switch affixed to the emergency vehicle in an actuator position readily accessible to an operator in the operator position.

23. Apparatus as recited in claim 13 further comprising a refill assembly.

24. Apparatus as recited in claim 13 further comprising an automated control system.

25. Vehicle engine emergency combustion air supply apparatus for the prevention of stalling of the engine in an oxygen depleted environment, the engine having an engine air intake, the apparatus comprising:
   a) pressurized air storage tank mounted on the vehicle, the tank having a pressurized air storage capacity adequate for supplying all of the combustion air required by the engine for a selected escape period;
   b) feed line fluidly connecting the storage tank to the engine air intake;
   c) feed valve; and
   d) automated feed valve actuator in communication with the feed valve.

26. Apparatus as recited in claim 25 further comprising an ambient air oxygen sensor in communication with the automated feed valve actuator.

27. Apparatus as recited in claim 25 further comprising a feed flow rate sensor installed in the feed line, the feed flow rate sensor being in communication with the automated feed valve actuator.

28. Apparatus as recited in claim 25 wherein the vehicle has an engine tachometer and the apparatus further comprises a tachometer link providing communication between the tachometer and the automated feed valve actuator.

29. Apparatus as recited in claim 25 further comprising a feed backflow preventor.

30. Apparatus as recited in claim 25 wherein the engine has an air filter housing with a filter air intake chamber, wherein the engine air intake is the filter air intake chamber, and wherein the feed line is fluidly connected to the filter air intake chamber.

31. Apparatus as recited in claim 30 further comprising a feed backflow flap for the filter air intake chamber.

32. Apparatus as recited in claim 30 further comprising feed line pressure activated feed backflow flap for the filter air intake chamber.

33. Apparatus as recited in claim 25 further comprising a refill assembly.

34. Apparatus as recited in claim 25 further comprising an automated control system.

35. Vehicle engine emergency combustion air supply apparatus for the prevention of stalling of the engine in an oxygen depleted environment, the engine having an engine air intake, the apparatus comprising:
   a) pressurized air storage tank mounted on the vehicle, the pressurized air storage tank having a pressurized air storage capacity adequate for supplying all of the combustion air required by the engine for a selected escape period;
   b) feed valve and feed line fluidly connecting the storage tank to the engine air intake, the feed valve and the feed line having hydraulic capacity, at a selected minimum tank pressure, for transmitting pressurized air to the engine air intake at a rate adequate for a design maximum engine rpm;
   c) feed valve actuator in communication with the feed valve; and
   d) feed backflow preventor for preventing or minimizing the loss, from the engine air intake, of air supplied from the air storage tank and preventing or minimizing the entrance of ambient air to the engine air intake.

36. Vehicle engine emergency combustion air supply apparatus for the prevention of stalling of the engine in an oxygen depleted environment, the engine having an engine air intake, the apparatus comprising:
   a) one or more pressured air storage tanks mounted on the vehicle, the pressurized air storage tanks having a total pressurized air storage capacity adequate for supplying all of the combustion air required by the engine for a selected escape period;
   b) one or more feed valves and one or more feed lines fluidly connecting the storage tanks to the engine air intake, the feed valves and the feed lines having a total hydraulic capacity, at a selected minimum tank pressure, for transmitting pressurized air to the engine air intake at a rate adequate for a design maximum engine rpm;
   c) feed valve actuator in communication with the feed valves; and
   d) feed backflow preventor for preventing or minimizing the loss, from the engine air intake, of air supplied from the air storage tanks and preventing or minimizing the entrance of ambient air to the engine air intake.

* * * * *